United States Patent
Hirose et al.

[11] Patent Number: 6,108,143
[45] Date of Patent: Aug. 22, 2000

[54] OPTICAL PICK-UP

[75] Inventors: Kazuo Hirose, Yokkaichi; Takashi Minami, Kuwana; Fuminori Satoji, Yokkaichi; Takaaki Kawakami, Yokohama, all of Japan

[73] Assignee: NTN Corporation, Osaka, Japan

[21] Appl. No.: 09/315,201

[22] Filed: May 19, 1999

[30] Foreign Application Priority Data

May 20, 1998 [JP] Japan .................................. 10-138238

[51] Int. Cl.$^7$ ...................................................... G02B 7/02
[52] U.S. Cl. ........................ 359/819; 359/811; 359/813; 359/814; 359/823
[58] Field of Search .................................... 359/811, 819, 359/813, 823, 814, 824; 235/449, 487

[56] References Cited

U.S. PATENT DOCUMENTS 5,942,744  8/1999  Kamo et al. ............................. 235/487
6,016,959  1/2000  Kamo et al. ............................. 235/449

FOREIGN PATENT DOCUMENTS

62-204440  9/1987  Japan .
62-245537  10/1987  Japan .
62-262236  11/1987  Japan .
62-262237  11/1987  Japan .

Primary Examiner—Loha Ben
Attorney, Agent, or Firm—Fulbright & Jaworski, LLP

[57] ABSTRACT

An optical pick-up comprising a supporting shaft and a lens holder having a bearing part which fits on the supporting shaft rotatably. At least one of the supporting shaft and the bearing part is formed of ceramics containing zirconia. The optical pick-up allows a lens to be supported at high dimensional accuracy for a high-density recording medium and suppresses resonance for a high-speed access to a disc.

18 Claims, 3 Drawing Sheets

OPTICAL PICK-UP

The present invention relates to an optical pick-up for use in an information recording/reproducing apparatus by optical means and a supporting shaft thereof.

The information recording/reproducing apparatus by optical means such as a video disc player, a digital audio player, an optical disc file, and the like has an optical pick-up for detecting a signal track (information pit array) on a disc and information thereon. If an objective lens of the optical pick-up has a dislocation (dislocation in radial direction of optical axis) in its optical axis, it is impossible to condense optical beams on a correct position of the disc surface and thus impossible to read information correctly. Thus, normally, a focal dislocation of the objective lens is compensated by a focusing servo, and a dislocation of the signal track is compensated by a tracking servo.

In the optical pick-up having such a compensation function, a supporting shaft is mounted on a base, and a lens holder is rotatably installed on the supporting shaft. A bearing is provided at the center of the lens holder, a driving coil is installed on the periphery of the lens holder, and the objective lens is installed on an eccentric position of the bearing.

The driving coil has a focusing coil and a tracking coil. The movement amount of the lens holder in its axial direction and its rotation amount are controlled according to electric current flowing through the focusing coil and electric current flowing through the tracking coil, respectively.

Various improvements have been made to enhance the response performance in the control over the movement and rotation amounts of the lens holder. For example, in Japanese Laid-Open Patent Publication No. 62-245537, a lubricant film formed of a polymer containing fluoroplastic is formed on the inner surface of a bearing installed on a lens holder supported by a supporting shaft made of stainless steel or the like and on the peripheral surface of the supporting shaft in contact with the inner surface of the bearing to improve the sliding contact characteristic therebetween.

In Japanese Laid-Open Patent Publication No. 62-262237, the use of a supporting shaft made of ceramic is disclosed to suppress resonance in a high-frequency region.

In Japanese Laid-Open Patent Publication No. 62-262236, the use of a bearing made of ceramic is disclosed to suppress resonance in a high-frequency region.

In Japanese Patent Publication No. 2713564, there is disclosed a optical pick-up in which a bearing formed separately from a lens holder and made of aluminum or an aluminum alloy is installed on a supporting shaft coated with a lubricant film to improve sliding contact characteristic.

However, it is difficult to maintain dimensional accuracy of the supporting shaft coated with the lubricant film in recording data on a high-density, mass-storage, and high-speed recording medium such as a CD-ROM, a CD-RAM, and a DvD and reproducing data therefrom. Further, it is difficult to control the movement of the lens holder because of high-speed-caused high-degree resonance. For example, to increase recording capacity of the DVD for a high-speed access, the track pitch of a compact disc and a digital audio disc is reduced from 1.6 $\mu$m to 0.74 $\mu$m. Further, the length of the shortest pit is reduced from 0.87 $\mu$m to 0.4 $\mu$m.

To focus optical beams on a signal track of a high-density disc, the optical pick-up is required to have much higher dimensional accuracy. Thus, it is necessary to support the objective lens at dimensional high accuracy by the supporting shaft so as to allow the optical pick-up to read information to cope with a developed high-density disc. To this end, it is necessary to improve the performance of the focusing servo and that of the tracking servo and improve the dimensional accuracy of the supporting shaft and the dimensional accuracy of the fit-on gap between the inner surface of the bearing and the outer surface of the supporting shaft. But it is difficult to improve the dimensional accuracy of the conventional supporting shaft made of metal and coated with the lubricant film. The supporting shaft made of conventional ceramics has inferior sliding-contact property.

Furthermore, because the speed of access to the disc has become high and thus the performance of the focusing servo and that of the tracking servo have been improved, namely, because of high-speed access, the lens holder and the supporting shaft resonate with each other at a higher frequency region. It is difficult for the conventional solid cylindrical supporting shaft made of ceramics to prevent the lens holder and the supporting shaft from resonating with each other, because it lacks elasticity.

Moreover, the bearing part using a metal material such as aluminum or an aluminum alloy is corroded at a high speed in a hot and humid atmosphere. In particular, when rust is generated on the sliding-contact surface, it is impossible to obtain a normal sliding-contact characteristic.

SUMMARY OF THE INVENTION

The present invention has been made to solve the above-described problems Thus, it is an object of the present invention to provide an optical pick-up allowing a lens to be supported at high dimensional accuracy to cope with development of a high-density recording medium and suppressing resonance to cope with development of art of allowing a high-speed access to a disc; a supporting shaft of the optical pick-up; and a lens holder.

That is, the optical pick-up or the present invention includes a supporting shaft and a lens holder having a bearing part which fits on the supporting shaft rotatably. At least one of the supporting shaft and the bearing part is formed of ceramics containing zirconia (zirconium oxide).

The bearing part formed on the lens holder of the optical pick-up or the supporting shaft thereof is formed of ceramics containing zirconia. Thus, the bearing part or the supporting shaft can be processed at high dimensional accuracy. Thus, the gap between the bearing part and the supporting shaft, namely, the dimensional accuracy of the fit-on gap therebetween can be allowed to be as high as 2–6 $\mu$m. Consequently, the objective lens can be supported at high dimensional accuracy, and thus optical beams can be focused on a high-density recording track.

DETAILED DESCRIPTION OF THE PREFERRED EMBODIMENTS

An example of the optical pick-up of the present invention will be described below with reference to FIGS. 1–3.

Figure 1:
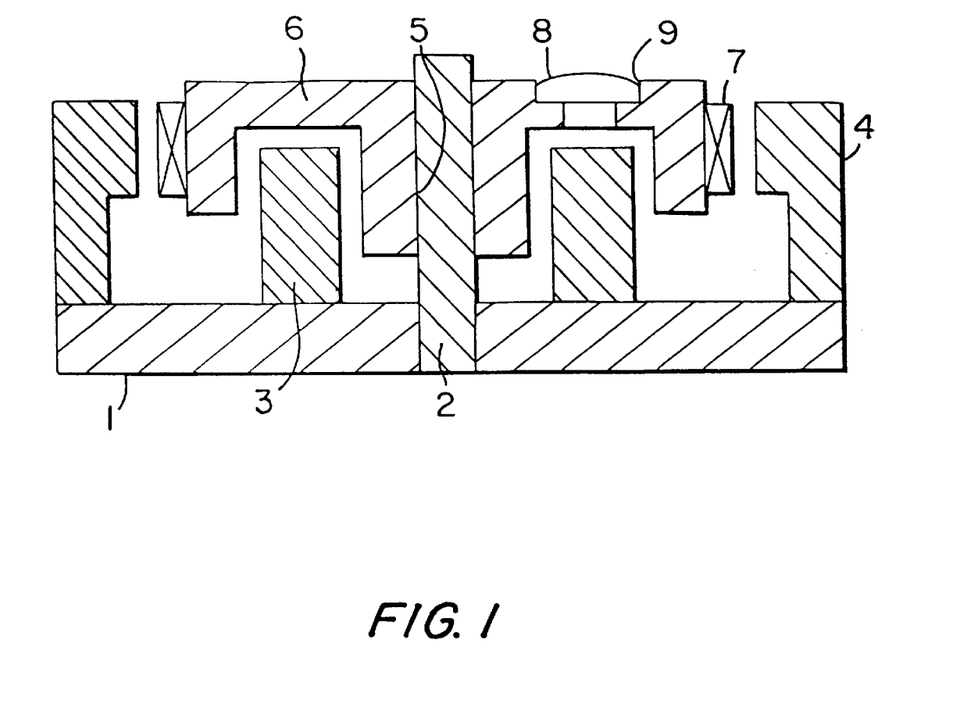
FIG. 1 is a sectional view showing an optical pick-up.
Figure 2:
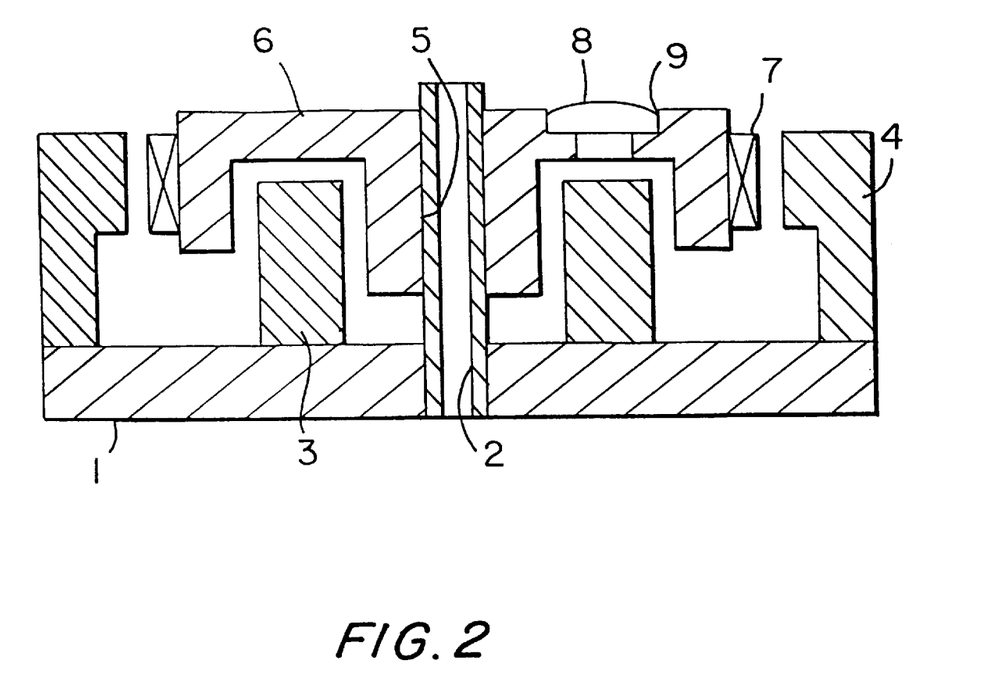
FIG. 2 is a sectional view showing an optical pick-up having a cylindrical supporting shaft.
Figure 3:
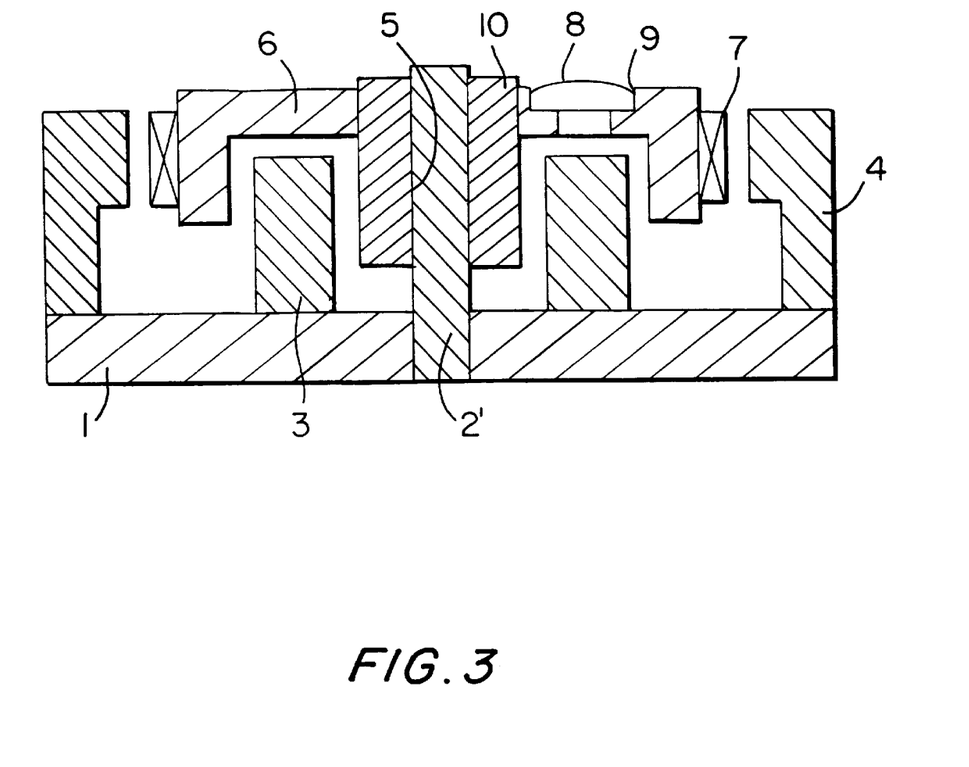
FIG. 3 is a sectional view showing an optical pick-up having a columnar supporting shaft.

Referring to FIGS. 1–3, a supporting shaft 2, a core 3, and a magnet 4 are installed on a base 1. A lens holder 6 fits on the supporting shaft 2 rotatably. A bearing part 5 or 10 is installed at the center of the lens holder 6. At least one of the supporting shaft 2 and the bearing part 5 or 10 is formed of ceramics containing zirconia. A driving coil 7 is installed on the periphery of the lens holder 6. A lens-installing hole 9 for installing an objective lens 8 on an eccentric position of the bearing part 5 or 10 is installed on the lens holder 6. The driving coil 7 is constructed of a focusing coil wound on the periphery on the axis of the bearing 5 or 10; and a tracking coil wound on the periphery of the lens holder 6 in the optical axis direction of the objective lens 8 and located at a position confronting each other, with a plane including the axis of the bearing 5 (10) set as a reference plane. The movement amount of the lens holder 6 in its axial direction and its rotation amount are controlled according to electric current flowing through the focusing coil and them tracking coil, respectively.

The supporting shaft 2 can be formed cylindrically, as shown in FIG. 2.

As shown in FIG. 3, a supporting shaft 2' coated with a lubricant film and the bearing part 10 of the lens holder 6 can be formed of ceramics containing zirconia.

In the present invention, the ceramics containing zirconia means that ceramics contain at least zirconia. For example, zirconia containing a stabilizer, complex ceramics consisting of alumina (aluminum oxide) and zirconia, and the like can be used as the ceramics containing zirconia.

In the present invention, the stabilizer means yttria (yttrium oxide), ceria (cerium oxide), calcia (calcium oxide), magnesia (magnesium oxide) or a combination of two or more thereof. Considering that the supporting shaft and the bearing part for the optical pick-up being required to have a high degree of strength, toughness, and smoothness on the surface thereof, it is preferable to use the stabilizer containing yttria as its main component.

Because the zirconia containing the stabilizer is superior in its sliding-contact property and wear resistance, it can maintain dimensional accuracy for long time. Futher, because the zirconia containing the stabilizer is superior in toughness, it can prevent breakage of component parts (supporting shaft, bearing part, and the like) when the supporting shaft for the optical pick-up is assembled and when the lens holder for the optical pick-up is shaped by a bearing insert molding method.

The content amount of the stabilizer is preferably 2–5 mole % in the came of the yttria and preferably 5–14 mole % in the case of the ceria. Zirconia containing them at a mole % out of the above range is not preferable as the material of the supporting shaft and the bearing for the optical pick-up. This is because the strength and toughness of the zirconia containing them can deteriorate and further, the stability of its tetragonal system can be lost.

The stabilizer can contain calcia and magnesia in addition to the yttria and the ceria. If the addition amount of the calcia or the magnesia exceeds 10 mole %, the strength and toughness of the zirconia containing them can deteriorate.

The crystalline phase of the zirconia containing the stabilizer consists of mainly a tetragonal system and a cubic system. The content percentage of the totragonal system is 40 vol % or more, and preferably, 60 vol % or more. It is preferable that the zirconia containing the stabilizer does not contain monoclinic system substantially. The zirconia containing the stabilizer and consisting of the tetragonal system and the cubic system and not containing the monoclinic system substantially means that it contains the monoclinic system at not more than 15 vol % and the tetragonal system and the cubic system at a remaining vol %.

The content percentage of the tetragonal system, the cubic system, and the monoclinic system can be calculated by obtaining a diffraction strength of a crystal face of each thereof. To this end, a polished surface of a zirconia material is examined by an X-ray diffraction apparatus.

When the content percentage of the tetragonal system is less than 40 vol %, the zirconia containing the stabilizer has a low degree of strength and toughness. Thus, the zirconia containing less than 40 vol % of the tetragonal system is not preferable as the material of the supporting shaft or the bearing. When the monoclinic system is present in the crystalline phase at more than 15 vol %, the uniformity of thee stabilizer is lost. In this case, the stability of the tetragonal system is inferior, and the content percentage of the monoclinic system increases gradually during a long time use. As a result, slight cracks and irregularities are formed on the surface of the zirconia containing the stabilizer. Thus, the supporting shaft and the bearing part made of the zirconia containing the stabilizer deteriorate in the smoothness thereof.

The content percentage of each of the tetragonal system, the cubic system, and the monoclinic system in the crystalline phase is determined not only by the kind of the stabilizer and the addition amount thereof, but also by the uniformity of the stabilizer and the diameter of the particle of the totragonal system. Thus, it is necessary to select zirconia satisfying the condition of the crystalline phase. The diameter of the particle of the tetragonal system is preferably not more than 1 $\mu$m.

Not only the control of the addition amount of the stabilizer, but also the use of the zirconia to which alumina is added at not more than 40 vol % is effective for preventing the stability of the stabilizer of the tetragonal system from deteriorating.

Further, the zirconia containing the stabilizer can be added to other ceramics to modify the other ceramics into a material suitable for the supporting shaft or the bearing part for the optical pick-up.

For example, the zirconia containing the stabilizer can be added to alumina. In this case a preferable addition thereof to the alumina is 30 vol % or more in forming a material containing both into the supporting shaft or the bearing part to reduce a center line average roughness and a maximum static coefficient of friction thereof.

A smoothness of the surface of the supporting shaft and that of the bearing part for the optical pick-up is important, because they slide in contact with each other. The ceramics of the present invention containing zirconia do not substantially contain the monoclinic system which causes generation of cracks and pores. Thus, it is possible to greatly prevent cracks and pores from being generated on the supporting shaft and the bearing part made of the ceramics containing the zirconia. Consequently, it is possible to allow the supporting shaft and the bearing part made of the ceramics containing the zirconia to have an improve strength and wear resistance. Solid columnar supporting shaft and hollow cylindrical supporting shaft for the optical pick-up are required to have a uniform outer diameter, respectively, and the bearing part of the lens holder is required to have a uniform bore. The ceramics containing the zirconia allow them to have such required dimensional tolerances.

For example, in the case of the solid columnar supporting shaft 2 shown in FIG. 1 and the hollow cylindrical supporting shaft 2 shown in FIG. 2, supposing that the length of each of the supporting shafts 2 is 5–20 mm and the outer diameter of each thereof is 0.8–3 mm, the dimensional tolerance of the outer diameter thereof can be maintained at a tolerance range within 10 $\mu$m or preferably within 4 $\mu$m.

In the case of the bearing part 10 shown in FIG. 3, the dimensional tolerance of the bore thereof can be maintained at a tolerance range within 10 μm or preferably within 4 μm.

Regarding the dimensional accuracy of the supporting shaft and the bearing part formed of molded and sintered ceramics containing zirconia, polishing allows the cylindricity of the sliding contact surface of each thereof to have a 0–3 μm finish and/or the center Line average roughness (Ra) of the sliding contact surface of each thereof to have a 0–1 μm finish. By so polishing the ceramics that the supporting shaft and the bearing part have the above configuration, it is possible to enhance the dimensional accuracy of the fit-on gap between the supporting shaft 2 and the bearing part 5 shown in FIGS. 1 and 2 and between the supporting shaft 2' and the bearing part 10 shown in FIG. 3.

In order for the sliding contact surface of the supporting shaft and the bearing part both made of the ceramics containing zirconia to have a center line average roughness (Ra) at 0–1 μm, it is necessary that the porosity of the ceramics containing zirconia is not more than 5%. As a method for decreasing the porosity, zirconia powder containing the stabilizer is processed by a normal pressure sintering method, a cold isostearic pressure press, a hot isostearic pressure press (HIP) or a hot press sintering method. The zirconia powder can be obtained by a chemical wet synthesizing method such as a co-precipitation method, a hydrolytic method or the like.

The polishing method can be carried out by a conventional method. It is preferable to use centerless polishing method of polishing the peripheral surface of the supporting shaft 2 by rolling it, without holding an end portion thereof. This method can allow the ceramics containing the zirconia to have the above dimensional tolerances.

If the deviation from the cylindricity of the sliding contact surface of the supporting shaft 2 and that of the bearing part 10 exceed 3 μm, it is difficult for the objective lens 8 to focus optical beams on a signal track. If the center line average roughness (Ra) of the sliding contact surface thereof exceeds 1 μm, a smooth movement thereof is prevented. As a result, response characteristic of optical pick-up becomes poor. The most favorable the deviation from the cylindricity and the surface roughness can be obtained as they come closer to closer to 0 μm.

The deviation from the cylindricity means the degree of a difference of the cylindrical part from a geometric cylindrical surface. The deviation from the cylindricity is defined in JIS B 0812 as a value expressed by the difference between the radius of the smallest cylindrical surface and the radius of the largest cylindrical surface. In the case of the supporting shaft, the center line average roughness (Ra) of the surface thereof means a center line average roughness (Ra) of the surface in the axial direction thereof. In the case of the bearing part, the center line average roughness (Ra) of the surface thereof means a center line average roughness (Ra) of the inner peripheral surface thereof in the axial direction thereof. Each center line average roughness (Ra) is defined in JIS B 0601.

The supporting shaft of the present invention can be made to be cylindrical. In the present invention, "cylindrical" means that the inside of a cylinder is coaxially hollow. That is, on a section perpendicular to the axis of the supporting shaft, concentric circles or polygons whose inner diameter is coaxial with the outer diameter. In order to prevent resonance at a high-frequency vibration, a cylinder whose inner diameter is coaxial with outer diameter is preferable. It is preferable that the thickness of the cylinder is 10–40% of the outer diameter thereof.

The rigidity of the cylindrical supporting shaft is higher than that of the supporting shaft having other configurations. Consequently, the cylindrical supporting shaft has a high natural frequency and thus occurrence of resonance can be prevented.

Embodiments 1–7

Ceramic powder containing zirconia shown in table 1 was prepared by wet mixing method. Obtained powder was pressed into the shape of a supporting shaft by using a cold isostearic molding method and was then sintered in the atmosphere at 1400° C. for two hours to obtain a supporting shaft having an outer diameter of φ 1.50 mm and a length of 10 mm. Then, centerless polishing method was performed to use it for an optical pick-up.

The deviation from the cylindricity and center line average roughness (Ra) of the obtained supporting shaft for the optical pick-up were measured by a contact type surface roughness-measuring device. A lens holder of the optical pick-up was prepared by molding a resinous compound of polyphenylene sulfide having a high degree of elasticity because it contains carbon fiber. A maximum static coefficient (μs) of friction of the supporting shaft with the lens holder was measured. The diameter of the inner periphery of the lens holder was φ 1.51 mm and the weight thereof was 0.5 g.

The maximum static coefficient (μs) of friction of the supporting shaft was measured as follows: The supporting shaft under test was inserted into a hole of a bearing of the lens holder and the supporting shaft is set horizontally. Then, the supporting shaft was inclined gradually. An inclination (θ) measured when the lens holder started to move in its axial direction was read: μs=tan θ. The result is shown in table 1.

Comparison Examples 1–3

A supporting shaft for optical pick-ups having the same Shape as that of the first embodiment were made of alumina ceramics stainless steel (SUS 402J) and stainless steel (SUS402J) having a lubricant film containing fluoroplastic polymer on the surface of the shaft.

The prepared supporting shafts for the optical pick-up were evaluated in the same method as that of the first embodiment. The result is shown in table 1.

TABLE 1

|  | E1 | E2 | E3 | E4 | E5 | E6 | E7 | C1 | C2 | C3 |
|---|---|---|---|---|---|---|---|---|---|---|
| Material of supporting shaft | | | | | | | | | | |
| Zirconia, mol % | 97 | 88 | 93 | 96 | 97 | 97 | 91 | — | — | — |
| Stabilizer | | | | | | | | | | |
| Yttria, mol % | 3 | — | 2 | 3 | 3 | 3 | — | — | — | — |
| Ceria, mol % | — | 12 | 5 | — | — | — | — | — | — | — |
| Calcia, mol % | — | — | — | 1 | — | — | — | — | — | — |
| Magnesia, mol % | — | — | — | — | — | — | 9 | — | — | — |
| Alumina, parts by Volume | — | — | — | — | 25 #1 | 67 #1 | — | — | — | 100 |
| Stainless steel, #2 | — | — | — | — | — | — | — | 100 | — | — |
| Coated stainless Steel, #3 | — | — | — | — | — | — | — | — | 100 | — |
| Content of tetragonal system, Vol % #4 | 71 | 97 | 96 | 60 | 73 | 73 | 70 | — | — | — |
| Characteristics | | | | | | | | | | |
| Deviation from the Cylindricity, μm | 0.5 | 0.5 | 0.5 | 0.5 | 0.5 | 0.5 | 0.5 | 0.8 | 1.0 | 0.5 |
| Center line average roughness, Ra | 0.02 | 0.02 | 0.02 | 0.02 | 0.02 | 0.02 | 0.02 | 0.04 | 0.07 | 0.03 |
| Maximum static Friction coefficient | 0.13 | 0.13 | 0.13 | 0.13 | 0.15 | 0.16 | 0.13 | 0.21 | 0.18 | 0.20 |

Note)
E: Embodiment
C: Comparison example
1: Rate of alumina for 100 parts by volume of zirconia containing stabilizer
2: SUS402J
3: Lubricant film containing fluoroplastic
4: Content of tetragonal system in zironcia

Embodiments 0–14

Ceramic powder containing zirconia shown in table 2 was prepared by wet mixing method. Obtained powder was pressed into the shape of a pipe by using the cold isostearic molding method, and was then sintered in the same condition as that of the first embodiment to obtain a hollowed cylindrical supporting shaft having an outer diameter of φ 1.50 mm an inner diameter of φ 1.0 mm, and a length of 10 mm. Then, the centerless polishing method was performed to use it for an optical pick-up.

The deviation from the cylindricity, center line average roughness (Ra), and maximum static coefficient (μs) of friction of the obtained supporting shaft for the optical pick-up were measured in the same condition as that of the first embodiment. The result is shown in table 2.

TABLE 2

|  | E8 | E9 | E10 | E11 | E12 | E13 | E14 |
|---|---|---|---|---|---|---|---|
| Material of supporting shaft | | | | | | | |
| Zirconia, mol % | 97 | 88 | 93 | 96 | 97 | 97 | 91 |
| Stabilizer | | | | | | | |
| Yttria, mol % | 3 | — | 2 | 3 | 3 | 3 | — |
| Ceria, mol % | — | 12 | 5 | — | — | — | — |
| Calcia, mol % | — | — | — | 1 | — | — | — |
| Magnesia, mol % | — | — | — | — | — | — | 9 |
| Alumina, parts by Volume | — | — | — | — | 25 #1 | 67 #1 | — |
| Stainless steel, #2 | — | — | — | — | — | — | — |
| Coated stainless Steel, #3 | — | — | — | — | — | — | — |
| Content of tetragonal system, Vol % #4 | 71 | 97 | 96 | 60 | 73 | 73 | 70 |
| Characteristics | | | | | | | |
| Deviation from the Cylindricity, μm | 0.5 | 0.5 | 0.5 | 0.5 | 0.5 | 0.5 | 0.5 |
| Center line average roughness, Ra | 0.02 | 0.02 | 0.02 | 0.02 | 0.02 | 0.02 | 0.02 |
| Maximum static Friction coefficient | 0.13 | 0.13 | 0.13 | 0.13 | 0.15 | 0.16 | 0.13 |

Note)
E: Embodiment
1: Rate of alumina for 100 parts by volume of zirconia containing stabilizer
2: SUS402J
3: Lubricant film containing fluoroplastic
4: Content of tetragonal system in zirconia

Embodiments 15–21

Ceramic powder containing zirconia shown in table 3 was prepared by wet mixing method. Obtained powder was pressed into the shape of a pipe by using, the cold isostearic molding method and was then sintered in the same condition as that of the first embodiment to obtain a hollow cylinder having an outer diameter of φ 2.8 mm, an inner diameter of φ 1.5 mm, and a length of 6 mm. Then, the inner peripheral surface of the cylinder was polished to prepare a slide bearing part having a bore of φ 1.51 mm. The bearing part was bonded to a predetermined position of a lens holder. The bearing part may be installed on the lens holder by insert molding.

The deviation from the cylindricity of the bore, center line average roughness (Ra), and maximum static coefficient (μs) of friction of the obtained bearing part were measured in the same condition as that of the first embodiment. In measuring the maximum static coefficient (μs) of friction, a lubricant film of a polymer containing fluoroplastic was formed on a supporting shaft made of stainless steel (SUS 402J) and polished by the centerless polishing method. The result is shown in table 3.

In the optical pick-up of the present invention, at least one of the supporting shaft and the bearing part is formed of ceramics containing zirconia. Thus, the supporting shaft and the bearing part can be formed at a high dimensional accuracy by surface treatment which is made by using polishing method. Consequently, the lens holder can support the supporting shaft at a high dimensional accuracy. Thus, the optical axis or the objective lens has an improved dimensional accuracy.

In the ceramics containing the zirconia, the zirconia contains the stabilizer; the crystalline phase of the zirconia consists of the tetragonal system and the cubic system; the content percentage of the tetragonal system of the crystalline

TABLE 3

|  | E15 | E16 | E17 | E18 | E19 | E20 | E21 |
|---|---|---|---|---|---|---|---|
| Material of bearing part | | | | | | | |
| Zirconia, mol % | 97 | 88 | 93 | 96 | 97 | 97 | 91 |
| Stabilizer | | | | | | | |
| Yttria, mol % | 3 | — | 2 | 3 | 3 | 3 | — |
| Ceria, mol % | — | 12 | 5 | — | — | — | — |
| Calcia, mol % | — | — | — | 1 | — | — | — |
| Magnesia, mol % | — | — | — | — | — | — | 9 |
| Alumina, parts by Volume | — | — | — | — | 25 #1 | 67 #1 | — |
| Stainless steel, #2 | — | — | — | — | — | — | — |
| Coated stainless Steel, #3 | — | — | — | — | — | — | — |
| Content of tetragonal system, Vol % #4 | 71 | 97 | 96 | 60 | 73 | 73 | 70 |
| Characteristics | | | | | | | |
| Deviation from the Cylindricity, μm | 0.5 | 0.5 | 0.5 | 0.5 | 0.5 | 0.5 | 0.5 |
| Center line average roughness, Ra | 0.02 | 0.02 | 0.02 | 0.02 | 0.02 | 0.02 | 0.02 |
| Maximum static Friction coefficient | 0.08 | 0.09 | 0.10 | 0.10 | 0.11 | 0.11 | 0.09 |

Note)
E: Embodiment
1: Rate of alumina for 100 parts by volume of zirconia containing stabilizer
2: SUS402J
3: Lubricant film containing fluoroplastic
4: Content of tetragonal system in zirconia
5: Supporting shaft made of stainless steel was used. After lubricant film containing fluoroplastic was formed thereon, it was polished by centerless polishing method.

As indicated in tables 1–3, the embodiments are superior to the comparison examples in the deviation from the cylindricity and the center line average roughness (Ra) and thus superior thereto in the sliding-contact characteristic thereof.

Using the supporting shaft obtained in the eighth embodiment, an optical pick-up was assembled. The result was that the lens holder vibrated at a high frequency vertically and horizontally; when vibrations were transmitted to the hollow cylindrical supporting shaft from the lens holder, the vibrations were suppressed and the supporting shaft had no resonance. Resonance was suppressed to a higher extent when the supporting shaft obtained in the eighth embodiment and the bearing part obtained in the 15th embodiment were combined with each other.

The bearing part obtained in each of the 15th–21st embodiments was combined with a supporting shaft made of stainless steel (SUS 402J). As described above, the lubricant film of the polymer containing the fluoroplastic was formed on the supporting shaft, and the supporting shaft was polished by the centerless polishing method to allow the dimensional accuracy of the outer diameter thereof to have a ±2 μm finish. Each of optical pick-ups assembled from the supporting shaft and each of the bearing parts was superior to the optical pick-up having the supporting shaft of the first embodiment in the accuracy of the optical axis of an objective lens.

phase is 40 vol % or more; and the zirconia does not contain the monoclinic system substantially. Therefore, cracks and pores can be greatly prevented from being generated on the surface of the supporting shaft and the bearing part, and thus the strength and toughness of the supporting shaft and the bearing part can be improved. Further, the dimensional accuracy of the optical axis of the objective lens can be improved.

The stabilizer consists of at least one of yttria, ceria, calcia, and magnesia. Thus, the strength and toughness of the supporting shaft and the bearing part can be improved.

The sliding surface of at least one of the supporting shaft and the bearing part formed of the ceramics containing the zirconia is 0–3 μm in the dediation from the cylindricity thereof. Thus, it is possible to enhance the dimensional accuracy of the fit-on gap between the supporting shaft and the bearing part.

Further, no coating process is required in the production of the supporting shaft of the present invention. Thus, the number of processes of producing the optical pick-up of the present invention is smaller than that of processes of producing the conventional optical pick-up which requires formation of a lubricant film made of a polymer containing fluoroplastic On the supporting shaft.

Furthermore, the supporting shaft of the present invention is cylindrical. Thus, when vibrations of a high frequency are transmitted to the supporting shaft, the vibrations are suppressed and the supporting shaft does not have resonance.

What is claimed is:

1. An optical pick-up comprising a supporting shaft; and a lens holder having a bearing part which fits on said supporting shaft rotatably, wherein at least one of said supporting shaft and said bearing part is formed of ceramics containing zirconia.

2. An optical pick-up according to claim 1, wherein said zirconia contains a stabilizer; a crystalline phase of said zirconia consists of a tetragonal system and a cubic system; said crystalline phase contains 40 vol % or more of said tetragonal system and does not contain a monoclinic system substantially.

3. An optical pick-up according to claim 2, wherein said zirconia contains not more than 15 vol % of said monoclinic system.

4. An optical pick-up according to claim 2, wherein said stabilizer is at least one oxide selected from the group consisting of yttria, ceria, calcia, and magnesia.

5. An optical pick-up according to claim 4, wherein said stabilizer is at least one oxide selected from the group consisting of yttria and ceria.

6. An optical pick-up according to claim 1, wherein said ceramics consists of said zirconia containing a stabilizer; a crystalline phase of said zirconia consists of a tetragonal system and a cubic system; said crystalline phase contains 40 vol % or more of said tetragonal system and does not contain a monoclinic system substantially.

7. An optical pick-up according to claim 1, wherein said ceramics consists of a mixture of said zirconia and alumina; said zirconia contains a stabilizer; a crystalline phase of said zirconia consists of a tetragonal system and a cubic system; said crystalline phase contains 40 vol % or more of said tetragonal system and does not contain a monoclinic system substantially.

8. An optical pick-up according to claim 1, wherein a sliding surface of at least one of said supporting shaft and said bearing part formed of said ceramics containing said zirconia is 0–3 $\mu$m in a deviation from cylindricity thereof.

9. An optical pick-up according to claim 1, wherein a sliding surface of at least one of said supporting shaft and said bearing part both formed of said ceramics containing said zirconia is 0–1 $\mu$m in a center line average roughness (Ra) of said sliding surface.

10. An optical pick-up according to claim 1, wherein said supporting shaft and said bearing part are formed of ceramics containing zirconia.

11. An optical pick-up according to claim 1, wherein said bearing part is formed of ceramics containing zirconia; and said supporting shaft is formed of stainless steel.

12. An optical pick-up according to claim 11, wherein a lubricant film is formed on a surfaces of said stainless steel.

13. An optical pick-up according to claim 1, wherein said supporting shaft is formed of ceramics containing zirconia; and said bearing part is formed of synthetic resin.

14. A supporting shaft for an optical pick-up, fitting on a bearing part of a lens holder and guiding said lens holder rotatably comprising a ceramics shaft containing zirconia.

15. A supporting shaft according to claim 14, said shaft is a columnar shaft.

16. A supporting shaft according to claim 14, said shaft is a cylindrical shaft.

17. A supporting shaft according to claims 14, wherein a sliding-contact surface of said shaft is formed of ceramics containing zirconia and processed by centerless polishing method.

18. A lens holder for an optical pick-up comprising a bearing part which fits on a supporting shaft rotatably, wherein said bearing part is formed of ceramics containing zirconia.

* * * * *

UNITED STATES PATENT AND TRADEMARK OFFICE
CERTIFICATE OF CORRECTION

PATENT NO. : 6,108,143
DATED : August 22, 2000
INVENTOR(S) : Hirose, et al.

It is certified that error appears in the above-identified patent and that said Letters Patent is hereby corrected as shown below:

On the cover page, in the section entitled Assignee, add - -Tosoh Corporation, Tokyo, Japan - -.

In column 1, line 56, change "DvD" to - - DVD - -.
In column 2, line 28, after "problem" insert period.
In column 3, line 57, change "toragonal" to - - tetragonal - -.
In column 4, line 11, change "thee" to - - the - -.
In column 4, line 24, change "toragonal" to - - tetragonal - -.
In column 4, line 41, after "case" insert - - , - -.
In column 4, line 54, change "improve" to - - improved - -.
In column 5, line 8, change "Line" to - - line - -.
In column 5, line 24, change "isostearic" to - - isostatic - -.
In column 6, line 22, change "isostearic" to - - isostatic - -.
In column 6, line 52, change "Shape" to - - shape - -.

UNITED STATES PATENT AND TRADEMARK OFFICE
CERTIFICATE OF CORRECTION

PATENT NO. : 6,108,143
DATED : August 22, 2000
INVENTOR(S) : Hirose, et al.

It is certified that error appears in the above-identified patent and that said Letters Patent is hereby corrected as shown below:

In column 7, line 31, change "isostearic" to -- isostatic --.
In column 9, Table 3, last line, column 2, change "0.08" to -- 0.09 --.
In column 10, line 65, change "On" to -- on --.
In column 12, line 16, change "surfaces" to -- surface --.

Signed and Sealed this

Twenty-ninth Day of May, 2001

Attest:

NICHOLAS P. GODICI

Attesting Officer

Acting Director of the United States Patent and Trademark Office